United States Patent [19]

Marsh et al.

[11] Patent Number: 5,223,819
[45] Date of Patent: Jun. 29, 1993

[54] MATERIAL LEVEL INDICATING APPARATUS WITH STATUS LIGHT AND EXTERNAL TEST FEATURES

[75] Inventors: Norman F. Marsh, Port Huron; Robert T. Eichberger, Mt. Clemens, both of Mich.

[73] Assignee: Bindicator Company, Port Huron, Mich.

[21] Appl. No.: 843,386

[22] Filed: Feb. 28, 1992

Related U.S. Application Data

[63] Continuation of Ser. No. 639,815, Jan. 9, 1991, abandoned, which is a continuation-in-part of Ser. No. 103,389, Oct. 1, 1987, Pat. No. 5,048,335.

[51] Int. Cl.⁵ .............................................. G08B 21/00
[52] U.S. Cl. .................................... 340/617; 340/615; 200/61.21
[58] Field of Search ............... 340/617, 615, 612, 618, 340/619, 620, 663; 73/290 R; 200/61.2, 61.21

[56] References Cited

U.S. PATENT DOCUMENTS 4,380,243  4/1983  Braley .............................. 340/604 X
4,392,032  7/1983  Roach, II ........................ 340/617 X
4,884,444  12/1989  Tuckey ............................ 340/615 X Primary Examiner—Jin F. Ng
Assistant Examiner—Jeffery A. Hofsass
Attorney, Agent, or Firm—Barnes, Kisselle, Raisch, Choate, Whittemore & Hulbert

[57] ABSTRACT

Apparatus for indicating level of material in a vessel that includes a probe for placement in the vessel at a position corresponding to a desired height at which material level is to be detected. Electronic circuitry is coupled to the probe, and is responsive to operating characteristics of the probe for sensing a change of such operating characteristics between a first operating characteristic at which material is spaced from the probe, and a second operating characteristic when material is adjacent to the probe. The electronic circuitry is contained within a closed housing mounted on the probe, and is connected to a source of electrical power positioned remotely of the vessel. A pair of status lamps are positioned on the housing, and are coupled to the electronic circuitry for respectively indicating application of electrical power to the circuitry and detection of one or the other of the operating characteristics at the probe. A reed switch is positioned within the housing, and is responsive to juxtaposition of a magnet externally of the housing for simulating one of the operating characteristics of the probe independently of actual material level at the probe.

7 Claims, 3 Drawing Sheets

MATERIAL LEVEL INDICATING APPARATUS WITH STATUS LIGHT AND EXTERNAL TEST FEATURES

This application is a continuation of application Ser. No. 07/639,815 filed Jan. 9, 1991, now abandoned which is a continuation-in-part of application Ser. No. 07/103,389 filed Oct. 1, 1987, now U.S. Pat. No. 5,048,335.

The present invention is directed to devices for indicating a predetermined level of material in a storage container—i.e., so-called point-level indicating devices, as distinguished from continuous level indicating devices.

BACKGROUND OF THE INVENTION

A number of devices have heretofore been proposed and made commercially available for indicating point-level of material in a storage container or vessel. For example, U.S. Pat. No. 3,625,058 discloses a device of this character in which a tuning fork is positioned at a predetermined height within the vessel at which material level indication is desired, and is coupled to a motor for vibrating the fork. When material is spaced from the fork, the fork is free to vibrate. However, when the material reaches the level of the fork and covers the fork, vibration is damped. Thus, the fact that the level of material in the vessel has reached the height of the fork may be detected as a function of vibration characteristics of the fork itself.

U.S. Pat. No. 3,834,235 discloses a device in which an optical probe is positioned at the desired height of material level detection in the vessel. Light energy is directed into the probe from externally of the vessel. When material is spaced from the probe within the vessel, the difference in indices of refraction between the probe material and air at the probe tip is such that the light energy is reflected back out of the vessel for detection. On the other hand, when material covers the probe tip, the refractive index differential at the probe tip is so altered that the light energy is directed into the material. Hence, the fact that material has reached the level of the probe tip may be detected externally of the vessel by absence of light energy reflected from the probe tip.

U.S. Pat. No. 4,392,032 discloses a device of the subject character in which the probe takes the form of a paddle positioned within the vessel at the desired height of material level detection, and is connected to a motor carried within a suitable housing externally of the vessel. When the material is spaced from the paddle, the paddle is free to rotate as driven by the motor. However, when the material reaches the level of the paddle, paddle rotation is retarded, and such retardation may be detected externally of the vessel.

U.S. Pat. No. 4,499,766 discloses a material level indicating device in which a capacitance probe is positioned within a vessel such that electrical characteristics at the probe vary as a function of dielectric properties of the material, which in turn vary as a function of material level. The probe is connected in an LC resonant circuit to an rf oscillator, and phase shift of the probe signal is monitored to indicate changes in material level.

OBJECTS AND SUMMARY OF THE INVENTION

Although devices as disclosed in the above-noted patents have enjoyed substantial commercial acceptance and success, improvements remain desirable. For example, although such devices are typically connected to a remote device for indicating operating characteristics and therefore material level within the vessel, it is desirable to provide an indication of operating status—e.g., application of electrical power and/or operating characteristics at the probe—at the device itself. This would assist an operator in determining status at individual vessels in a field of vessels without having to return to the remote status board. It is also desirable to provide facility for testing operation of the device from externally of the device without having to remove the housing cover. It is therefore a general object of the present invention to provide these and other improvements in material point-level indicating devices of the described character.

Apparatus for indicating level of material in a vessel in accordance with the present invention includes a probe for placement in the vessel at a position corresponding to a desired height at which material level is to be detected. In the various embodiments of the invention herein disclosed, such probe may comprise a capacitance probe, an optical probe, a vibration fork, a rotating paddle or a pair of ultrasonic transducers spaced from each other across a material gap. Electronic circuitry is coupled to the probe, and is responsive to operating characteristics of the probe for sensing a change of such operating characteristics between a first operating characteristic at which material is spaced from the probe, and a second operating characteristic when material is adjacent to the probe. The electronic circuitry is contained within a closed housing mounted on the probe, and is connected to a source of electrical power positioned remotely of the vessel. A pair of status lamps are positioned on the housing and are coupled to the electronic circuitry for respectively indicating application of electrical power to the circuitry and detection of one or the other of the first and second operating characteristics at which level of material in the vessel is either spaced from or adjacent to the probe. The circuitry further includes a switch positioned within the housing, and responsive to application of energy through the wall of the housing from externally of the housing, for simulating the second operating characteristic of the probe independently of actual material level at the probe. In the preferred embodiment of the invention, the switch comprises a reed switch responsive to application of magnetic energy from a permanent magnet or the like external to the housing so as to simulate such second operating characteristic of the probe and illuminate the second status lamp.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
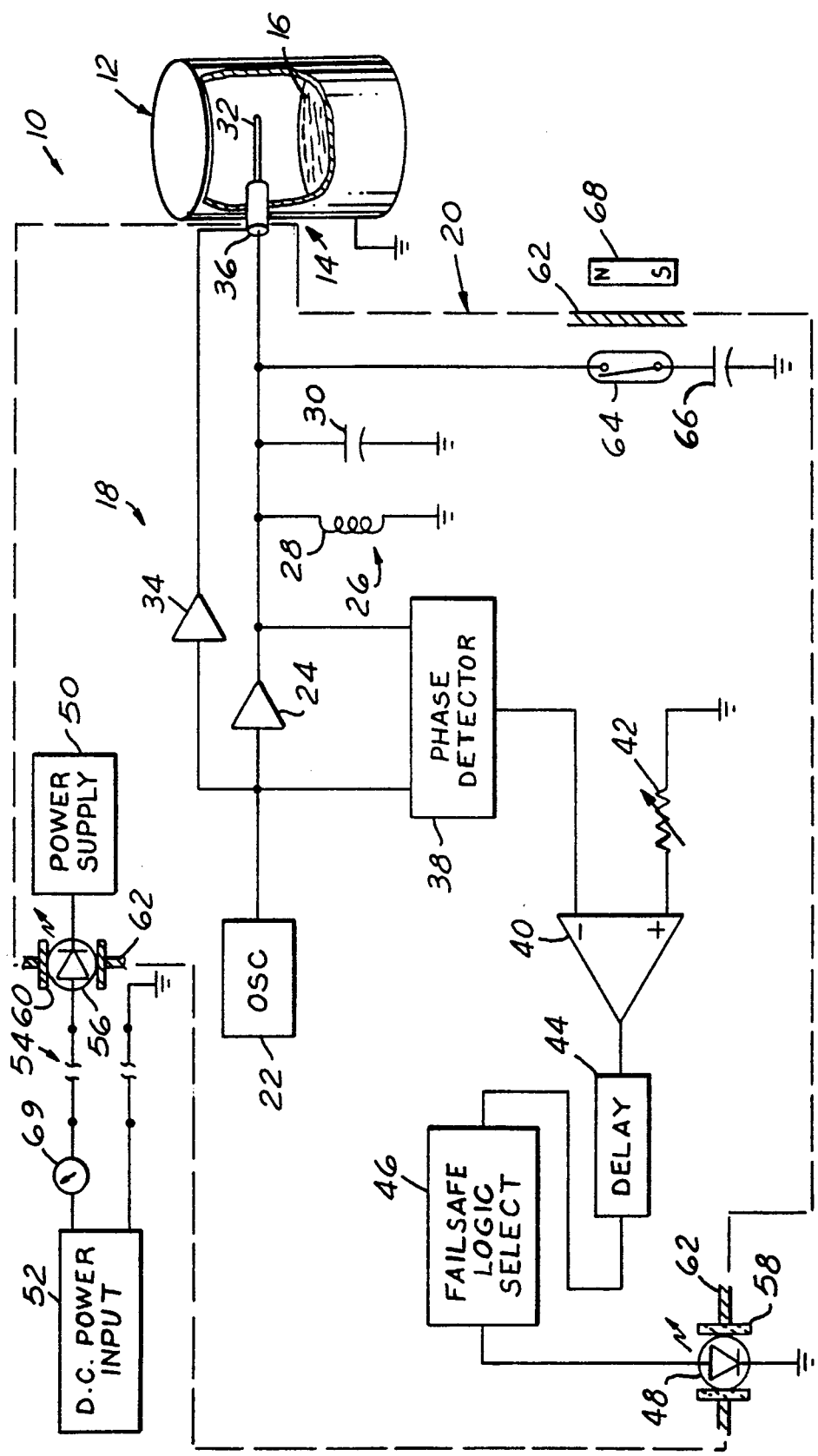
FIG. 1 is an electrical schematic diagram of one presently preferred embodiment of the invention in an rf capacitance-type application.

FIG. 1 illustrates apparatus 10 in accordance with one presently preferred embodiment of the invention as comprising a capacitance probe 14 mounted on the sidewall of a vessel 12 at a position corresponding to the height at which it is desired to detect the level of material 16 within the vessel. Electronic circuitry 18 is carried within a closed housing 20 mounted on probe 14 externally of vessel 12. The housing and probe construction are illustrated in greater detail in U.S. Pat. No. 4,499,766 referenced above. Circuitry 18 includes an rf oscillator 22 that provides a periodic output signal to a phase shift amplifier 24. The output of amplifier 24 is connected to a parallel LC resonant circuit 26 that includes an inductor 28 and a capacitor 30 connected in parallel with the probe conductor 32 of probe 14. Thus, the capacitance probe forms part of resonant circuit 26. The output of oscillator 22 is also connected through a unity gain amplifier 34 to the guard shield 36 of probe 14. The wall of vessel 12 is connected to electrical ground.

A phase detector 38 has first and second inputs connected to the outputs of oscillator 22 and amplifier 24 respectively. The output of phase detector 38 is connected to the signal input of a comparator 40, which receives a reference input from a variable resistor 42. The output of comparator 40 is connected through a delay 44 to a fail safe logic select amplifier 46 that drives an LED 48. Circuitry 18 is powered by a power supply 50, which in turn receives electrical power from a remote d.c. power input source 52 that is connected to supply 50 by a two-wire cable 54. An LED 56 is connected in series between remote power input 52 and power supply 50, and thus indicates application of electrical power to power supply 50 and the remainder of circuitry 18. LED's 48,56 are positioned in respective lenses 58,60 in the wall 62 of enclosure 20 so as to indicate status of circuitry 18 externally of enclosure 20.

In operation, LED 56 is illuminated as long as power is applied to the detection circuitry. Assuming that material 16 is spaced from probe 14 as shown in FIG. 1, LED 48 is illuminated by logic select amplifier 46 if low level fail safe operation is selected or is extinguished if high level fail safe operation is selected (as would be typical). Fail safe logic selection is performed by an operator usually upon unit installation.

Oscillator 22 continuously applies an rf signal to probe 14 as long as power is applied to supply 50. Capacitance at probe 14 increases as material level increases, so that the phase difference between the output of oscillator 22 and the output of amplifier 24 to resonant circuit 26 correspondingly increases with material level. When this phase differential, reflected at the output of phase detector 38, reaches the level of reference 42, the output of comparator 40 switches accordingly. After delay 44, LED 48 is illuminated by amplifier 46 (assuming high level fail safe selection). In the event that the level of material 16 in vessel 12 decreases, the phase differential at detector 38 correspondingly decreases, comparator 40 and amplifier 46 turn off, and LED 48 is extinguished. LED 56 thus indicates application of electrical power to circuitry 18, and LED 48 indicates point-level operating characteristics at probe 14.

A normally open reed switch 64 is positioned within enclosure 20 at a preselected position adjacent to enclosure wall 62, and is electrically connected in series with a capacitor 66 across capacitor 30. The capacitance of capacitor 66 is selected to be equal to or greater than maximum capacitance of material 16 within vessel 12 when the material is adjacent to probe 14. Thus, when a magnet 68 is positioned adjacent to reed switch 64 externally of housing wall 62 so that the magnetic flux from magnet 68 closes the contacts of reed switch 64, capacitor 66 is connected to resonant circuit 26. Capacitor 66 thereby simulates operation of probe 14 when the level of material is adjacent to the probe, independent of actual material level at the probe, so as to test operation of the remaining circuitry 18. Thus, if circuitry 18 is operating correctly, positioning of magnet 68 externally adjacent to reed switch 64 should cause illumination of LED 48. When magnet 68 is removed, LED 48 should be extinguished (assuming that level of material 16 is remote from probe 14). Circuitry 18 is such that current drawn by the circuitry through two-wire connection 54 is at one of two essentially distinct levels, one level being a relatively low current level when material is spaced from probe 14, and the other being a higher current level when material is adjacent to the probe and LED 48 is illuminated by amplifier 46. These two current levels, thus corresponding to the operating states at probe 14, which in turn correspond to low and high levels of material 16, may be detected by a meter 69 or other suitable device connected in series between power source 52 and power supply 50.

Figure 2:
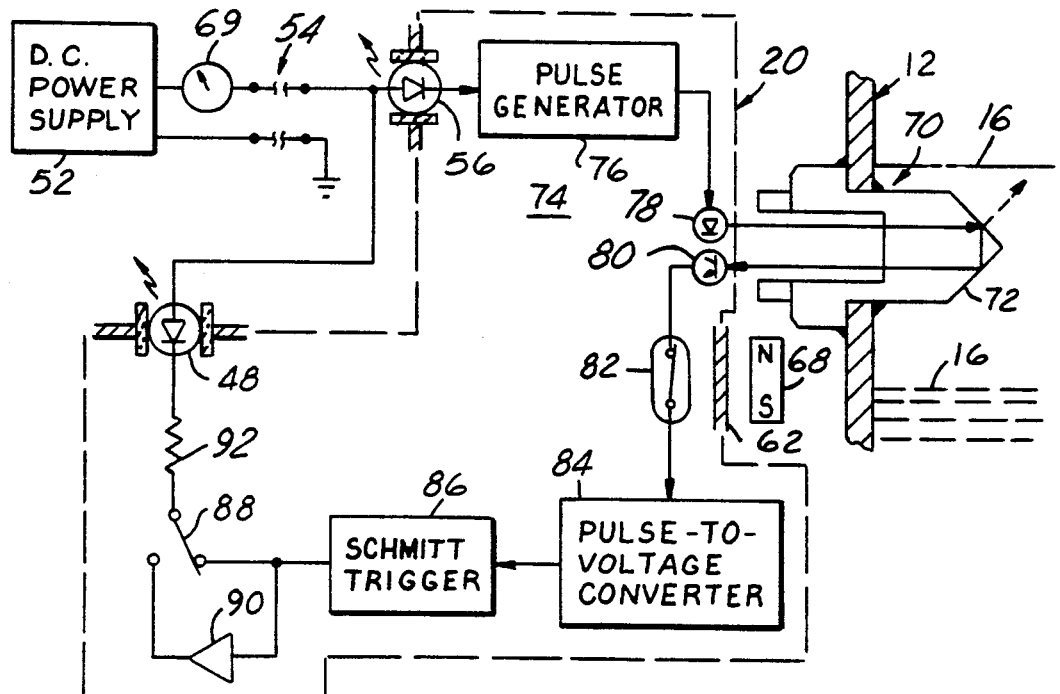
FIGS. 2-5 are electrical schematic diagrams of other preferred implementations of the invention.

FIG. 2 illustrates application of the invention in an electro-optical point-level device of the type disclosed in U.S. Pat. No. 3,834,235. Reference numerals in FIG. 2 (and in FIGS. 3-5) identical to those employed in connection with FIG. 1 indicate identical elements. A transparent probe 70 is mounted on the sidewall of vessel 12 at a position corresponding to desired height of material level detection. Probe 70 comprises an optically transparent element having a tapering end or tip 72. Housing 20 is mounted on probe 70 externally of vessel 12, and level detection circuitry 74 is contained within housing 20. Circuitry 74 includes a pulse generator 76 that receives power from remote supply 52 through meter 69, two-wire interconnection 54 and LED 56 connected in series. The output of pulse generator 74 is connected to a light source, such as an LED 78. LED 78 is so positioned with respect to probe 70 as to direct a beam of light energy through the probe to probe tip 72. A photodetector 80 is likewise positioned with respect to probe 70 so as to receive light internally reflected from tip 72. The output of detector 80 is connected through a normally closed reed switch 82 to a frequency-to-voltage convertor 84. The output of convertor 84, which is a d.c. voltage that varies as a function of frequency of input pulses, is fed to a Schmitt trigger 86. A single-pole double-throw switch 88 has one switch contact connected to the output of Schmitt trigger 86, and a second switch contact connected to the trigger output through an inverter 90. The common contact of switch 88 is connected in series through a resistor 92 and LED 48 to the power input to pulse generator 76.

In operation, pulse generator 76 drives LED 78 and generates pulses to probe 70 as long as power is applied to circuitry 74. When material 16 is below the level of probe 70, as shown in solid lines in FIG. 2, the difference in indices of refraction at probe tip 72 between probe 70 and the air within vessel 12 is such that the light energy from LED 78 is internally reflected at the probe tip, and is incident on detector 80. With reed switch 82 closed, the output pulses from detector 80 are fed to converter 84, which produces a voltage level sufficient to trigger Schmitt trigger 86. When material 16 rises to the position shown in phantom, the indices of refraction at probe tip 72 between probe 70 and material 16 are such that most or all of the light energy from LED 78 is transmitted into the material. Detector 80 no longer supplies pulses to convertor 84, and the output Schmitt trigger 86 changes states. LED 48 is illuminated at either a high or low level of material 16 in vessel 12, depending upon position of switch 88. For example, in the position shown in FIG. 2, LED 48 is illuminated when convertor 84 is deprived of input pulses from detector 80, indicating a level of material adjacent to probe 70. Positioning of magnet 68 adjacent to reed switch 82 externally of housing wall 62 opens reed switch 82, and deprives convertor 84 of input pulses from detector 80 independently of level of material 16. As in the embodiment of FIG. 1, the current from supply 52 to circuitry 74 is essentially at two levels, one corresponding to a level at which convertor 84 receives pulses from detector 80, and the other corresponding to a condition at which convertor 84 is deprived of such pulses. Thus, point-level of material 16 relative to probe 70 may be detected by a meter 69 connected between power supply 52 and LED 56.

Figure 3:
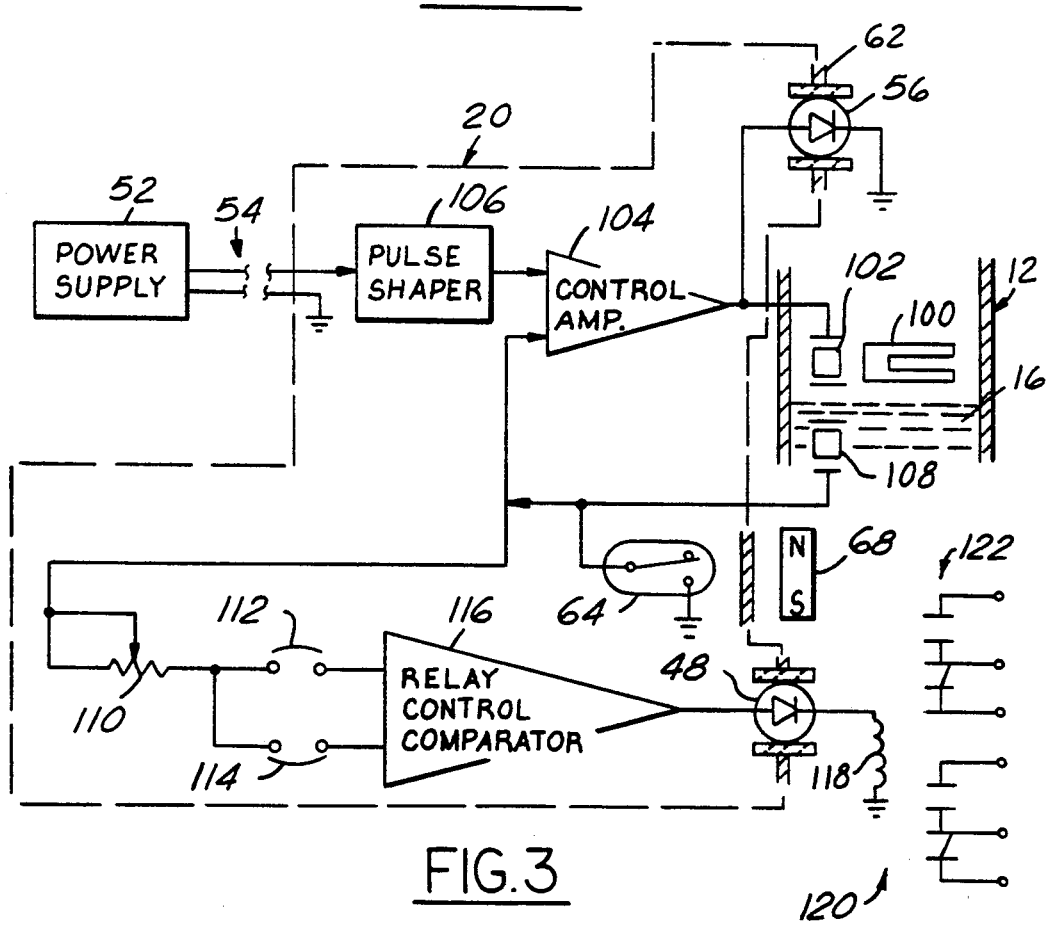

FIG. 3 illustrates implementation of the invention in a vibrating tuning-fork device of the type disclosed in U.S. Pat. No. 3,625,058. The material probe in this embodiment comprises a tuning fork 100 coupled to a drive or transmitting crystal 102. Crystal 102 is driven by an amplifier 104, which in turn is controlled by a pulse shaper 106. Pulse shaper 106 receives power from remote supply 52 through two-wire cable 54. Power-indicating LED 56 is connected to the output of control amplifier 104. A second crystal 108 is positioned adjacent to crystal 102, and is connected through a variable time delay resistor 110, and through a pair of jumpers 112,114, to respective inputs of a relay control comparator 116. The output of comparator 116 is connected through LED 48 to the coil 118 of a relay 120. Relay 120 has suitable normally open and/or normally closed switch contacts 122 for connection to circuitry external to housing 20. A normally open reed switch 64 is connected across crystal 108, and is positioned internally adjacent to the wall 62 of housing 20 for coupling to external magnet 68 as desired.

In operation, pulse shaper 106 energizes crystal 102 through amplifier 104 as long as power is supplied by remote supply 52. When material is spaced from fork 100, the fork is free to vibrate, and such vibration is sensed by crystal 108. Jumper 112 or 114 is factory selected (and the other jumper is removed) depending on whether high level fail safe or low level fail safe operation is desired. When the material within vessel 12 rises to a level so as to contact tuning fork 100, vibration of the tuning fork is effectively damped, and vibration pulses are no longer received at crystal 108. Thus, depending upon whether low level or high level operation is desired, LED 48 and relay 118 are energized during one operating state of tuning fork 100 and crystal 108, and are de-energized at the other operating state. A level of material in contact with tuning fork 100 is simulated by bringing magnet 68 into external proximity to reed switch 64, which closes the reed switch contacts and effectively grounds the output of crystal 108.

Figure 4:
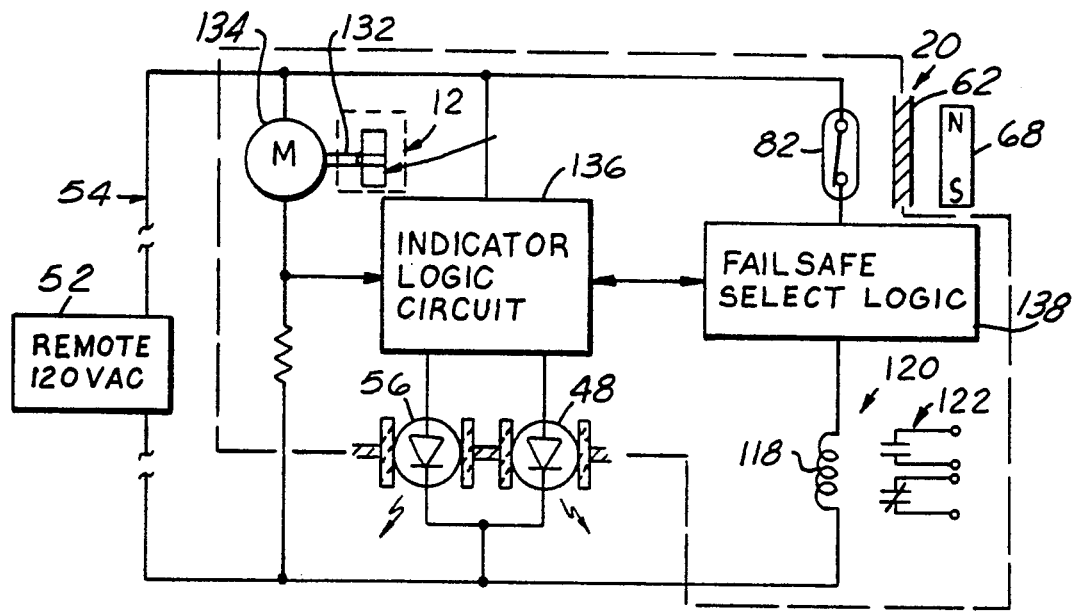

FIG. 4 illustrates implementation of the present invention in a rotating paddle bin level indicator of the type disclosed in U.S. Pat. No. 4,392,032. The material probe 130 in this implementation of the invention comprises a paddle connected by a shaft 132 to a motor 134 positioned within housing 20 externally of vessel 12. Motor 134 is powered by remote power source 52, which supplies 120 VAC through two-wire interconnection 54. LED 48 is coupled to an indicator logic circuit 136, which is connected to motor 134 and responsive to current passing therethrough to indicate a stall condition at paddle 130. Likewise, LED 56 is connected to circuit 136 so as to indicate application of electrical power to motor 134. Relay 118 is connected to indicator logic circuit 136 through fail safe logic 138. Fail safe logic 138 and indicator logic 136 are disclosed in detail in above-noted U.S. Pat. No. 4,392,032. Power is supplied to logic 138 and relay 120 through normally closed reed switch 82, which is positioned internally adjacent to wall 62 of housing 20 so as to be responsive to external positioning of magnet 68 adjacent thereto.

In operation, power is normally applied to motor 134, which rotates paddle 130 within vessel 132. As long as material is spaced from paddle 130, the paddle 130 is free to rotate as powered by motor 134. When the material rises to the level of paddle 130, frictional engagement between the paddle and the material retards rotation of the paddle, stalling motor 134, and thereby indicating level of material as a function of the current drawn by the motor. Other methods of detecting retardation of paddle rotation are disclosed in U.S. Pat. Nos. 2,851,553, 3,412,887, 4,095,064, 4,147,906 and 4,695,685. LED 56 is illuminated as long as power is applied. LED 48 is illuminated when the motor is stalled (assuming high level fail safe operation is selected, or extinguished if low level operation is selected).

Figure 5:
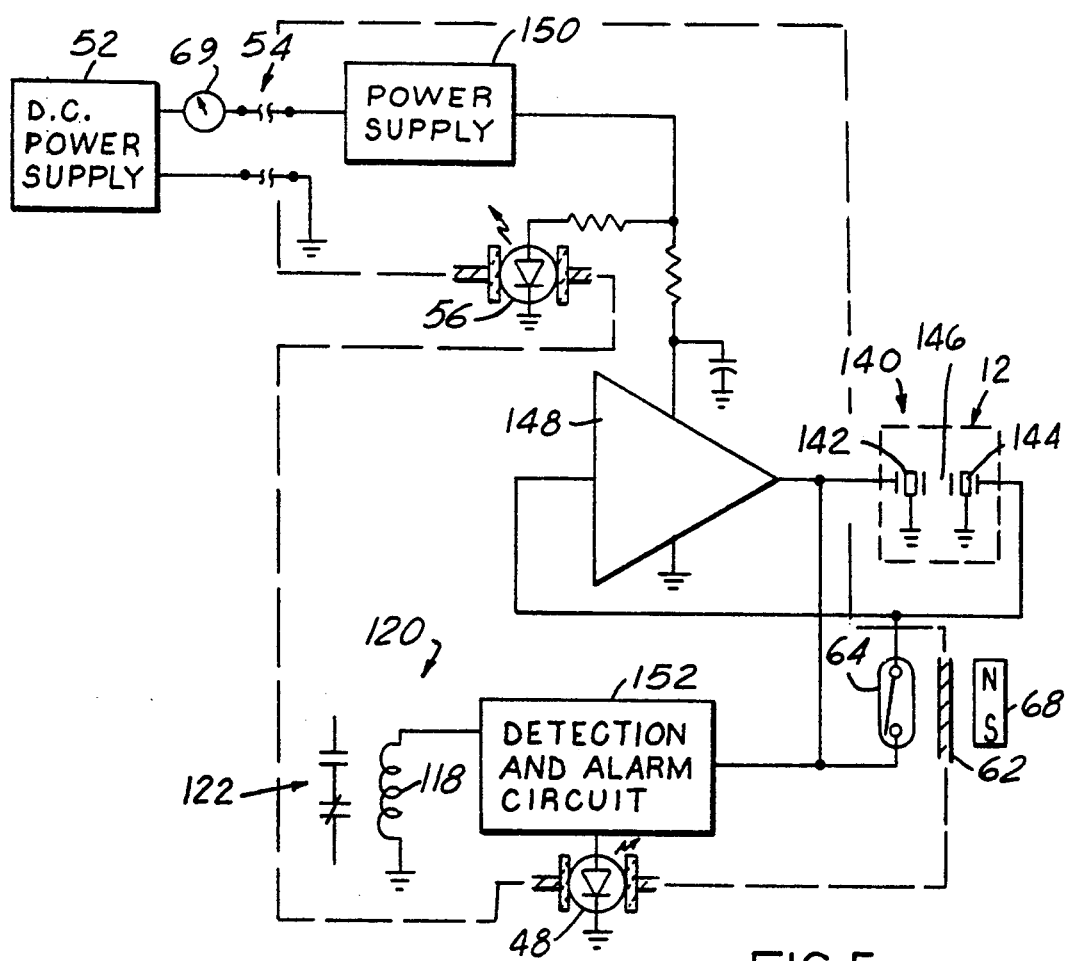

FIG. 5 illustrates implementation of the invention in an otherwise conventional point-level device in which material level is detected when material in a gap between ultrasonic transducers alters transmission of energy therebetween. Specifically, the probe 140 in the device of FIG. 5 comprises a pair of crystals 142,144 carried within vessel 12 at a position corresponding to the height at which material level is to be detected. Crystals 142,144 are spaced from each other (by a suitable means not shown) so as to define a gap 146 therebetween. Crystal 142 is driven by an amplifier 148 that receives power from a power supply 150. Power supply 150 receives electrical power from remote source 52 by means of two-conductor interconnection 54. Crystal 144 is connected to the control input of amplifier 148, whereby the combination of crystals 142,144 form an oscillator that oscillates when material is positioned in gap 146, enhancing coupling between the crystals, and which terminates oscillation when material is spaced from gap 146, which is to say that gap 146 is filled with air. A detection and alarm circuit 152 is responsive to oscillation at amplifier 148 for energizing LED 48 and relay 120 (assuming high level fail safe selection), thereby indicating presence of material in gap 146. When such material is absent, relay 120 is de-energized and LED 48 is extinguished. Normally open reed switch 64 is connected across crystals 142,144, and is responsive to external adjacent positioning of magnet 68 effectively to short circuit the crystals, and thereby simulate presence of material in gap 146 independently of actual material level.

Preferably, in all disclosed embodiments, reed switch 64 is positioned within the unit housing, as previously described in connection with each embodiment. However, it is within the scope of the invention in its broadest aspect to position such switch means remotely of the unit, external to the housing, for remote test of the devices.

We claim:

1. Apparatus for indicating level of material in a vessel that comprises:
   probe means for placement in the vessel at a position corresponding to a desired height at which material level is to be detected,
   a source of electrical power positioned remotely of the vessel,
   circuit means coupled to said probe means and responsive to operating characteristics of said probe means for sensing a change in said operating characteristics between a first operating characteristic at which material level is spaced from said probe means and a second operating characteristic when material level is adjacent to said probe means, said circuit means being contained within a closed housing mounted on said probe means, and being connected to said power source by two-wire interconnection means that provides the sole interconnection between said power source and said circuit means so as to receive electrical power from said source,
   first status lamp means disposed on said housing at a position observable from outside of said housing and coupled to said circuit means for indicating application of electrical power to said circuit means from said source,
   second status lamp means disposed on said housing at a position observable from outside of said housing and coupled to said circuit means for indicating detection of one or the other of said first and second operating characteristics of said probe means when level of material in the vessel is spaced from or adjacent to said probe means respectively,
   said circuit means further including a reed switch coupled to said circuit means and positioned within said housing, and a permanent magnet for application of energy through said housing to said switch from outside of said housing for simulating one of said first and second operating characteristics at said probe means independently of actual material level at said probe means, and means for drawing current through said two-wire interconnection means at first and second discrete magnitudes corresponding to said first and second operating characteristics at said probe means, and
   means remote from said housing coupled to said two-wire interconnection means and responsive to current in said two-wire interconnection means for detecting said first and second magnitudes and indicating said first and second operating characteristics.

2. The apparatus set forth in claim 1 wherein said first and second status lamp means comprise respective LED's.

3. The apparatus set forth in claim 2 wherein said LED's are of different color.

4. The apparatus set forth in claim 1 wherein said first and second status lamp means are of different color for distinguishing therebetween.

5. Apparatus for indicating level of material in a vessel that comprises:
   probe means for placement in the vessel at a position corresponding to a desired height at which material level is to be detected,
   a source of electrical power positioned remotely of the vessel,
   circuit means coupled to said probe means and responsive to operating characteristics of said probe means for sensing a change in said operating characteristics between a first operating characteristic at which material level is spaced from said probe means and a second operating characteristic when material level is adjacent to said probe means, said circuit means being contained within a closed housing mounted on said probe means, and being connected to said power source so as to receive electrical power from said source,
   first status lamp means disposed on said housing and coupled to said circuit means for indicating application of electrical power to said circuit means from said source,
   second status lamp means disposed on said housing and coupled to said circuit means for indicating detection of one or the other of said first and second operating characteristics of said probe means when level of material in the vessel is spaced from or adjacent to said probe means respectively,
   said first and second status lamp means being positioned on said housing so as to be observable from outside of said housing when said housing and said probe means are mounted on a vessel, said first and second status lamp means being of differing colors for distinguishing therebetween,
   said circuit means further including a reed switch, within said housing coupled to said circuit means for simulating one of said first and second operating characteristics at said probe means independently of actual material level at said probe means, and
   a permanent magnet for applying energy to said reed switch from outside of said housing so as to simulate said one operating characteristic and illuminate said second lamp means.

6. The apparatus set forth in claim 5 wherein said circuit means is connected to said power source by two-wire interconnection means that provides the sole interconnection between said power source and said circuit means.

7. The apparatus set forth in claim 6 wherein said circuit means includes means for drawing current through said two-wire interconnection means at first and second magnitudes corresponding to said first and second operation states at said probe means, and wherein said apparatus further includes means remote from said housing coupled to said two-wire interconnection means and responsive to magnitude of current in said two-wire interconnection means for detecting said first and second states at said circuit means.

* * * * *